(12) United States Patent
Bruno et al.

(10) Patent No.: US 11,358,725 B2
(45) Date of Patent: Jun. 14, 2022

(54) THREE WHEEL AND SIMPLE CYCLE AIRCRAFT ENVIRONMENTAL CONTROL SYSTEM

(71) Applicant: Hamilton Sundstrand Corporation, Charlotte, NC (US)

(72) Inventors: Louis J. Bruno, Ellington, CT (US); Jeffrey Ernst, Wethersfield, CT (US); John M. Maljanian, Farmington, CT (US); Gregory L. DeFrancesco, Simsbury, CT (US); Thomas M. Zywiak, Southwick, MA (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 180 days.

(21) Appl. No.: 15/888,737

(22) Filed: Feb. 5, 2018

(65) Prior Publication Data
US 2019/0002109 A1 Jan. 3, 2019

Related U.S. Application Data

(63) Continuation-in-part of application No. 15/793,585, filed on Oct. 25, 2017.
(Continued)

(51) Int. Cl.
*B64D 13/08* (2006.01)
*B64D 13/06* (2006.01)

(52) U.S. Cl.
CPC ...... *B64D 13/08* (2013.01); *B64D 2013/0618* (2013.01)

(58) Field of Classification Search
CPC .................. B64D 13/06; B64D 13/08; B64D 2013/0618; B64D 13/00;
(Continued)

(56) References Cited

U.S. PATENT DOCUMENTS 5,461,882 A  10/1995  Zywiak
5,704,218 A  1/1998  Christians et al.
(Continued)

FOREIGN PATENT DOCUMENTS

EP  1457420 A1  9/2004
EP  1790568 B1  1/2012
(Continued)

OTHER PUBLICATIONS

Podratzky, Andreas; Extended European Search Report; 18180378.4; dated Nov. 27, 2018; 19 Pages.
(Continued)

*Primary Examiner* — Harry E Arant
(74) *Attorney, Agent, or Firm* — Cantor Colburn LLP

(57) ABSTRACT

An environmental control system of an aircraft includes a ram air circuit including a ram air shell having a plurality of heat exchangers positioned therein, the plurality of heat exchangers including a first heat exchanger, a second heat exchanger, and a third heat exchanger. The ram air circuit is configured and arranged so that a first medium received at the first heat exchanger passes through the first heat exchanger and then through the third heat exchanger and so that a second medium received at the second heat exchanger passes through the second heat exchanger. A compressing device is arranged in fluid communication with the ram air circuit.

15 Claims, 5 Drawing Sheets

Related U.S. Application Data

(60) Provisional application No. 62/525,984, filed on Jun. 28, 2017.

(58) Field of Classification Search
CPC .... B64D 2013/0603; B64D 2013/0607; B64D 2013/0611; B64D 2013/0614; B64D 2013/0622; B64D 2013/0625; B64D 2013/0633; B64D 2013/0637; B64D 2013/064; B64D 2013/0644; B64D 2013/0648; B64D 2013/0651; B64D 2013/0655; B64D 2013/0659; B64D 2013/0662; B64D 2013/0666; B64D 2013/067; B64D 2013/0681; B64D 2013/0685; B64D 2013/0688; B64D 2013/0692; B64D 2013/0696
See application file for complete search history.

(56) References Cited

U.S. PATENT DOCUMENTS

| | | | |
|---|---|---|---|
| 5,768,896 A * | 6/1998 | Kline | B64D 13/06 62/87 |
| 5,918,472 A * | 7/1999 | Jonqueres | B64D 13/06 62/172 |
| 6,257,003 B1 | 7/2001 | Hipsky | |
| 6,283,410 B1 | 9/2001 | Thompson | |
| 6,381,969 B1 | 5/2002 | Afeiche et al. | |
| 6,427,471 B1 | 8/2002 | Ando et al. | |
| 6,942,183 B2 | 9/2005 | Zywiak | |
| 7,334,423 B2 | 2/2008 | Bruno et al. | |
| 9,669,936 B1 | 6/2017 | Fiterman et al. | |
| 2003/0177780 A1 * | 9/2003 | Brutscher | B64D 13/06 62/401 |
| 2004/0172963 A1 | 9/2004 | Axe et al. | |
| 2005/0235659 A1 | 10/2005 | Brutscher et al. | |
| 2006/0162371 A1 | 7/2006 | Lui et al. | |
| 2007/0119205 A1 * | 5/2007 | Zywiak | B64D 13/06 62/401 |
| 2008/0110193 A1 * | 5/2008 | Jonqueres | B64D 13/06 62/331 |
| 2011/0259546 A1 | 10/2011 | Defrancesco et al. | |
| 2014/0048229 A1 | 2/2014 | Cuthbert | |
| 2015/0121842 A1 | 5/2015 | Moes | |
| 2017/0060125 A1 * | 3/2017 | Beaven | G05B 23/0235 |
| 2017/0152050 A1 * | 6/2017 | Klimpel | B64D 13/08 |
| 2019/0002108 A1 | 1/2019 | Bruno | |

FOREIGN PATENT DOCUMENTS

| | | |
|---|---|---|
| EP | 2947012 A1 | 11/2015 |
| EP | 3098165 B1 | 1/2019 |
| EP | 3421364 A1 | 1/2019 |
| JP | S54151297 A | 11/1979 |
| JP | 2003240375 A * | 8/2003 |
| JP | 2003240375 A | 8/2003 |

OTHER PUBLICATIONS

Pedersen, Kenneth; Extended European Search Report; 19155507.7; dated Jul. 1, 2019; 9 pages.

European Office Action; Application No. 18180378.4-1010; dated Nov. 8, 2019; 20 pages.

U.S. Final Office Action; U.S. Appl. No. 15/793,585, filed Oct. 25, 2017; dated Jan. 29, 2020; 22 pages.

European Office Action; International Application No. 18180378.4-1010; International Filing Date: Jun. 28, 2018 dated Jun. 19, 2020; 4 pages.

U.S. Non-Final Office Action; U.S. Appl. No. 15/793,585, filed Oct. 25, 2017; dated Jun. 17, 2020; 27 pages.

* cited by examiner

THREE WHEEL AND SIMPLE CYCLE AIRCRAFT ENVIRONMENTAL CONTROL SYSTEM

CROSS-REFERENCE TO RELATED APPLICATIONS

This application claims the benefit of U.S. Non-Provisional application Ser. No. 15/793,585, filed on Oct. 25, 2017, and priority to U.S. Provisional Application Ser. No. 62/525,984 filed Jun. 28, 2017, the disclosure of which are incorporated herein by reference in their entirety.

BACKGROUND

Embodiments of the disclosure relate to the art of environmental control systems.

Aircraft need to have their internal environment controlled. There are several different ways that this can be achieved. For example, commercial aircraft are conventionally equipped with two-pack environmental control system architectures that include redundant packs installed in separate bays beneath a center wing box of the aircraft and are encapsulated by the aircraft wing-to-body fairing. These bays are commonly separated by a keel beam that supports the weight of the aircraft in the event of a wheels-up landing. Local penetrations of the keel beam can be accommodated if properly reinforced.

Smaller configurations of environmental control system architectures can include pack-and-a-half architectures that fit within a single volume. However, the pack-and-a-half architecture systems may be too large for use in conventional locations, and thus may be required to be installed in other locations of the aircraft (e.g., in a tail cone of the aircraft). It may be beneficial to further reduce the size of pack-and-a-half environmental control system architectures.

BRIEF DESCRIPTION

According to one or more embodiments, an environmental control system of an aircraft includes a ram air circuit including a ram air shell having a plurality of heat exchangers positioned therein, the plurality of heat exchangers including a first heat exchanger, a second heat exchanger, and a third heat exchanger. The ram air circuit is configured and arranged so that a first medium received at the first heat exchanger passes through the first heat exchanger and then through the third heat exchanger and so that a second medium received at the second heat exchanger passes through the second heat exchanger. A compressing device is arranged in fluid communication with the ram air circuit.

In addition to one or more of the features described above, or as an alternative, in further embodiments the first heat exchanger, the second heat exchanger and the third heat exchanger are coupled together.

In addition to one or more of the features described above, or as an alternative, in further embodiments the first heat exchanger, the second heat exchanger and the third heat exchanger are distinct portions within a single unitary body.

In addition to one or more of the features described above, or as an alternative, in further embodiments the first heat exchanger, the second heat exchanger and the third heat exchanger are arranged sequentially relative to a flow of ram air.

In addition to one or more of the features described above, or as an alternative, in further embodiments the ram air is configured to interact with the third heat exchanger prior to the first heat exchanger and the second heat exchanger.

In addition to one or more of the features described above, or as an alternative, in further embodiments the second heat exchanger is positioned between the first heat exchanger and the third heat exchanger.

In addition to one or more of the features described above, or as an alternative, in further embodiments the first heat exchanger is positioned between the second heat exchanger and the third heat exchanger.

In addition to one or more of the features described above, or as an alternative, in further embodiments the first medium is bleed air.

In addition to one or more of the features described above, or as an alternative, in further embodiments the second medium is fresh air.

According to another embodiment, an environmental control system of an aircraft includes a ram air circuit including a ram air shell having a plurality of heat exchangers including at least a first heat exchanger and a second heat exchanger positioned therein. Each of the plurality of heat exchangers has an inlet end and the inlet ends of the plurality of heat exchangers are arranged adjacent to one another such that a medium flows through each of the plurality of heat exchangers in the same direction. A compressing device is arranged in fluid communication with the ram air circuit.

In addition to one or more of the features described above, or as an alternative, in further embodiments the first heat exchanger and the second heat exchanger are coupled together.

In addition to one or more of the features described above, or as an alternative, in further embodiments the first heat exchanger and the second heat exchanger are distinct portions within a single unitary body.

In addition to one or more of the features described above, or as an alternative, in further embodiments the plurality of heat exchangers further comprises a third heat exchanger, the first heat exchanger, the second heat exchanger and the third heat exchanger being arranged sequentially relative to a flow of ram air.

In addition to one or more of the features described above, or as an alternative, in further embodiments the flow of ram air is configured to interact with the third heat exchanger prior to the first heat exchanger and the second heat exchanger.

In addition to one or more of the features described above, or as an alternative, in further embodiments the plurality of heat exchangers further comprises a third heat exchanger, and the second heat exchanger is positioned between the first heat exchanger and the third heat exchanger.

In addition to one or more of the features described above, or as an alternative, in further embodiments the first medium is bleed air.

In addition to one or more of the features described above, or as an alternative, in further embodiments the second medium is fresh air.

In addition to one or more of the features described above, or as an alternative, in further embodiments the medium provided to each inlet end of the plurality of heat exchangers is warmer than a flow of ram air at each of the plurality of heat exchanger.

Additional features and advantages are realized through the techniques of the embodiments herein. Other embodiments are described in detail herein and are considered a part of the claims. For a better understanding of the embodiments with the advantages and the features, refer to the description and to the drawings.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the FIGS.

Embodiments herein provide an environmental control system of an aircraft that mixes mediums from different sources and uses energy from one or more of the different sources to power the environmental control system and to provide cabin pressurization and cooling at a high fuel burn efficiency. The mediums described herein are generally types of air; however, it should be understood that other mediums, such as gases, liquids, fluidized solids, or slurries are also contemplated herein.

Figure 1:
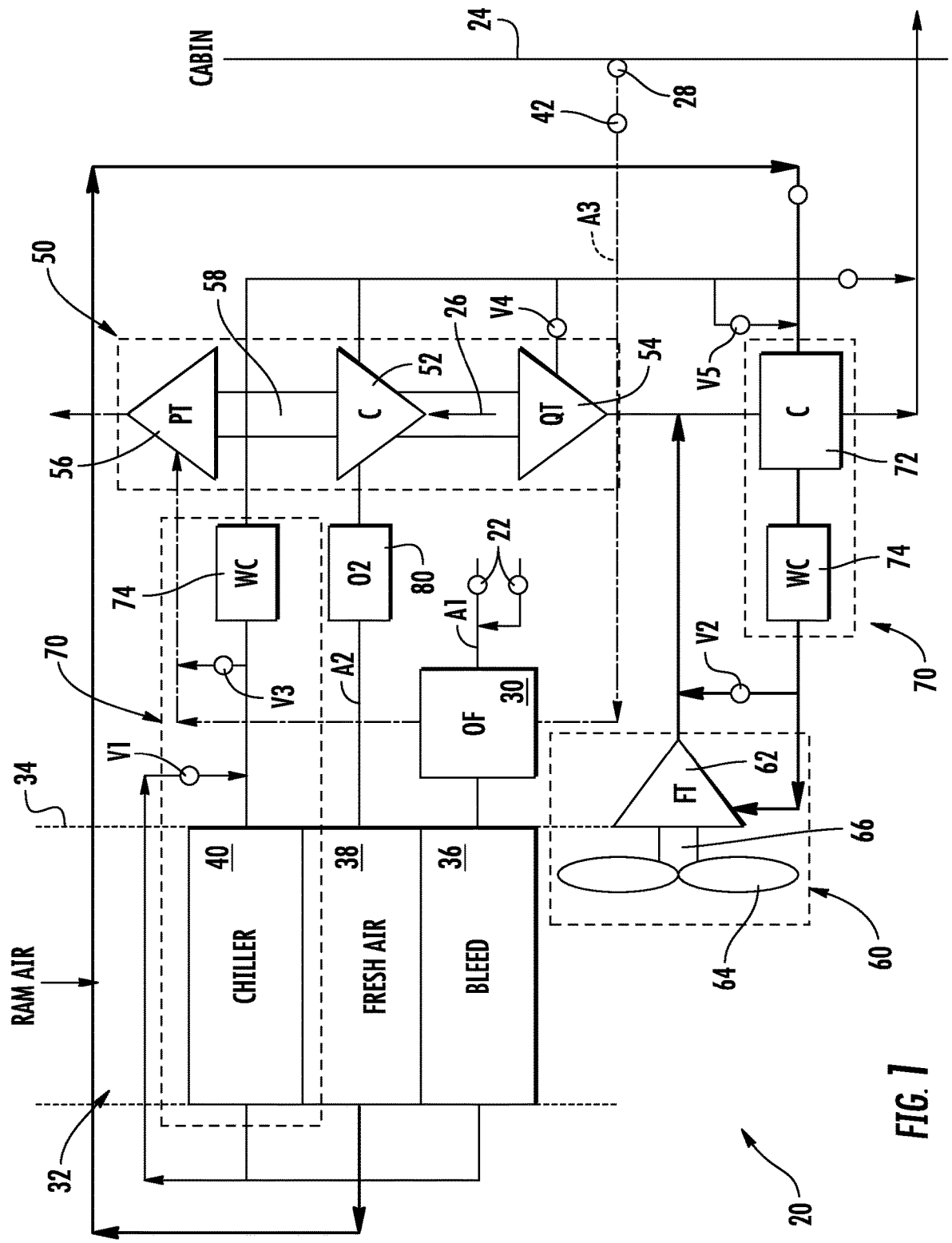
FIG. 1 is a simplified schematic of a system according to one embodiment.

With reference now to FIG. 1, a schematic diagram of an environment control system (ECS) 20 is depicted according to non-limiting embodiments. Although the environmental control system 20 is described with reference to an aircraft, alternative applications are also within the scope of the disclosure. As shown in the FIG., the system 20 can receive a first medium A1 at a first inlet 22 and provide a conditioned form of the first medium A1 to a volume 24. In embodiments where the environmental control system 20 is used in an aircraft application, the first medium A1 is bleed air, which is pressurized air originating from i.e. being "bled" from, an engine or auxiliary power unit of the aircraft. It shall be understood that or more of the temperature, humidity, and pressure of the bleed air can vary based upon a compressor stage and revolutions per minute of the engine.

The system 20 receives a second medium A2 at an inlet 26. In an embodiment, the second medium A2 is fresh air, such as outside air for example. The outside air can be procured via one or more scooping mechanisms, such as an impact scoop or a flush scoop for example. Thus, the inlet 26 can be considered a fresh or outside air inlet. Generally, the fresh air A2 described herein is at an ambient pressure equal to an air pressure outside of the aircraft when the aircraft is on the ground, and is between an ambient pressure and a cabin pressure when the aircraft is in flight.

The system 20 can further receive a third medium A3 from the volume 24. In one embodiment the volume is the cabin of an aircraft, and the third medium A3 is cabin discharge air, which is air leaving the volume 24 that would typically be discharged overboard. For example, the cabin discharge air can be supplied to a destination, such as an outlet 28. In the illustrated, non-limiting embodiment, the outlet 28 is arranged in fluid communication with an outflow heat exchanger 30. In some embodiments, the system 20 is configured to extract work from the third medium A3. In this manner, the pressurized air of the volume 24 can be utilized by the system 20 to achieve certain operations.

The environmental control system 20 includes a RAM air circuit 32 including a shell or duct, illustrated schematically at 34, within which one or more heat exchangers are located. The shell 34 can receive and direct a medium, such as ram air for example, through a portion of the system 20. The one or more heat exchangers are devices built for efficient heat transfer from one medium to another. In an embodiment, the one or more heat exchangers may be separate heat exchangers positioned generally adjacent one another, or coupled to one another, within the duct 34. Alternatively, the one or more heat exchangers may include a single heat exchanger body having distinct portions, each of which is configured to receive a separate fluid and function as a separate heat exchanger within the unitary body. Examples of the type of heat exchangers that may be used, include, but are not limited to, double pipe, shell and tube, plate, plate and shell, adiabatic shell, plate fin, pillow plate, and fluid heat exchangers.

The one or more heat exchangers arranged within the shell 34 may be referred to as ram heat exchangers. In the illustrated, non-limiting embodiment, the ram heat exchangers include a first heat exchanger 36, a second heat exchanger 38, and a third heat exchanger 40. Within the heat exchangers 36, 38, 40 ram air, such as outside air for example, acts as a heat sink to cool a medium passing there through, for example the first medium A1 and/or the second medium A2. Because the ram air is configured to flow over the one or more heat exchangers sequentially, the temperature of the ram air within the ram air circuit will gradually increase toward the outlet. However, each of the mediums provided to the one or more heat exchangers or heat exchanger portions has a temperature that is greater than the temperature of the ram air at that heat exchanger or heat exchanger portion.

As previously mentioned, the system 20 may include a first outflow heat exchanger 30. The outflow heat exchanger 30 may be arranged upstream from the first heat exchanger 36 such that initial cooling of the first medium A1 is performed within the outflow heat exchanger 30 and secondary cooling of the first medium A1 is performed in the first heat exchanger 36. In an embodiment, the third medium A3, such as exhaust of cabin air for example, is recirculated to the system 20 from the pressurized volume 24, through a valve 42. As shown, the third medium A3 may be selectively provided via operation of the valve 42 to the outflow heat exchanger 30, where heat is transferred to the third medium A3 via a heat exchange relationship with the first medium A1, before being provided to another component of the system 20.

The system 20 additionally comprises at least one compressing device 50. In the illustrated, non-limiting embodiment, the compressing device 50 of the system 20 is a mechanical device that includes components for performing thermodynamic work on a medium (e.g., extracts work from or applies work to the first medium A1, the second medium A2, and/or the third medium A3 by raising and/or lowering pressure and by raising and/or lowering temperature). Examples of the compressing device 50 include an air cycle machine, a three-wheel air cycle machine, a four-wheel air cycle machine, etc.

As shown, the compressing device 50 includes a compressor 52, a turbine 54, and a power turbine 56 operably coupled to each other via a shaft 58. The compressor 52 is a mechanical device that raises a pressure of a medium and can be driven by another mechanical device (e.g., a motor or a medium via a turbine). Examples of compressor types include centrifugal, diagonal or mixed-flow, axial-flow, reciprocating, ionic liquid piston, rotary screw, rotary vane, scroll, diaphragm, air bubble, etc. As shown, the compressor 52 is configured to receive and pressurize the second medium A2. The turbine 54 and the power turbine 56 are mechanical devices that expand a medium and extract work therefrom (also referred to as extracting energy). In the compressing device 50, the turbines 54, 56 drive the compressor 52 via the shaft 50.

The system 20 additionally comprises at least one expansion device 60. The expansion device 60 is a mechanical device, similar to the compressing device 50, that includes components for performing thermodynamic work on a medium (e.g., extracts work from or applies work to the first medium A1 and/or the second medium A2 by raising and/or lowering pressure and by raising and/or lowering temperature). Examples of the expansion device 60 include, but are not limited to, a simple air cycle machine or a tip turbine fan etc.

In the illustrated, non-limiting embodiment, the expansion device 60 is a two-wheel air cycle machine including a turbine 62 and a fan 64 operably coupled via a shaft 66. However, it should be understood that any suitable expansion device, including an air cycle machine having any number of wheels (i.e. three-wheel or four-wheel) are also within the scope of the disclosure. The turbine 62 is a mechanical device that expands a medium and extracts work therefrom. In the expansion device 60, the turbine 62 drives rotation of the fan 64 via the shaft 66. In a non-limiting embodiment, the turbine 62 can comprise a nozzle configured to accelerate a medium supplied thereto for entry into a turbine impeller (not shown). The fan 64 is a mechanical device that can force via push or pull methods a medium (e.g., ram air) through the shell 34 across the one or more ram heat exchangers 36, 38, 40 and at a variable cooling to control temperatures.

The system 20 additionally includes at least one dehumidification system 70. In the illustrated, non-limiting embodiment, the dehumidification system 70 includes a condenser 72 and a water collector 74. The condenser 72 is a particular type of heat exchanger and the water collector 74 is a mechanical device that performs a process of removing water from a medium. In the illustrated, non-limiting embodiment, the system 20 includes a first dehumidification system 70 for use with the first medium A1, and a second dehumidification system 70 for use with the second medium A2. In such embodiments, the third heat exchanger 40 may function as the condenser 72 for the dehumidification system 70 associated with the first medium A1.

The elements of the system 20 are connected via valves, tubes, pipes, and the like. Valves (e.g., flow regulation device or mass flow valve) are devices that regulate, direct, and/or control a flow of a medium by opening, closing, or partially obstructing various passageways within the tubes, pipes, etc. of the system. Valves can be operated by actuators, such that flow rates of the medium in any portion of the system can be regulated to a desired value. For instance, a first valve V1 is arranged within the fluid line configured to bypass the third heat exchanger 40. The valve V1 may be operable to control a temperature of the medium output from the third heat exchanger 40. A second valve V2 may be disposed within a conduit between an outlet of the water extractor 74 of the second dehumidification system 70 and the outlet of the turbine 62 of the expansion device 60. Operation of the second valve V2 allows a medium to selectively bypass the expansion device 60.

The system 20 has four primary modes of operation: Overdrive mode, Bleed and Fresh air mixing mode, Fresh air mode, and a Pack and a Quarter mode. With reference to FIGS. 2-5, it should be understood that each of the various modes of operation is illustrated with reference to operation during a hot day (temperatures greater than 85° F.). Accordingly, under such conditions, operation of one or more of the components of the ECS 20 may not be required, and such components are shown as being grayed out in the FIGS. However, it should be understood that under other operating conditions, all or a portion of the grayed out components may be operational.

At least one of the mediums provided to the ram air heat exchangers 36, 38, 40 passes sequentially through a plurality of the heat exchangers or heat exchanger portions. In an embodiment, the first heat exchanger 36, the second heat exchanger 38, and the third heat exchanger 40 are arranged such that the ram air flows sequentially over the third heat exchanger 40, the second heat exchanger 38, and the first heat exchanger 36. In other embodiments, the second heat exchanger 38 may be arranged downstream from both the first heat exchanger 36 and the third heat exchanger 40. Regardless of the position of the second heat exchanger 38 within the ram air duct 34, a first medium, such as bleed air A1 for example, is caused to flow through the first heat exchanger 36 and then through the third heat exchanger 40. Further, each of the heat exchangers 36, 38, 40 has an inlet end to which a medium is supplied. The inlet end of each of the plurality of heat exchangers 36, 38, 40 may be generally adjacent one another, such as aligned for example, such that a medium flows through each of the plurality of heat exchangers in the same direction. In an embodiment, each medium is configured to flow through the heat exchangers 36, 38, 40 in a direction from right to left.

Figure 2:
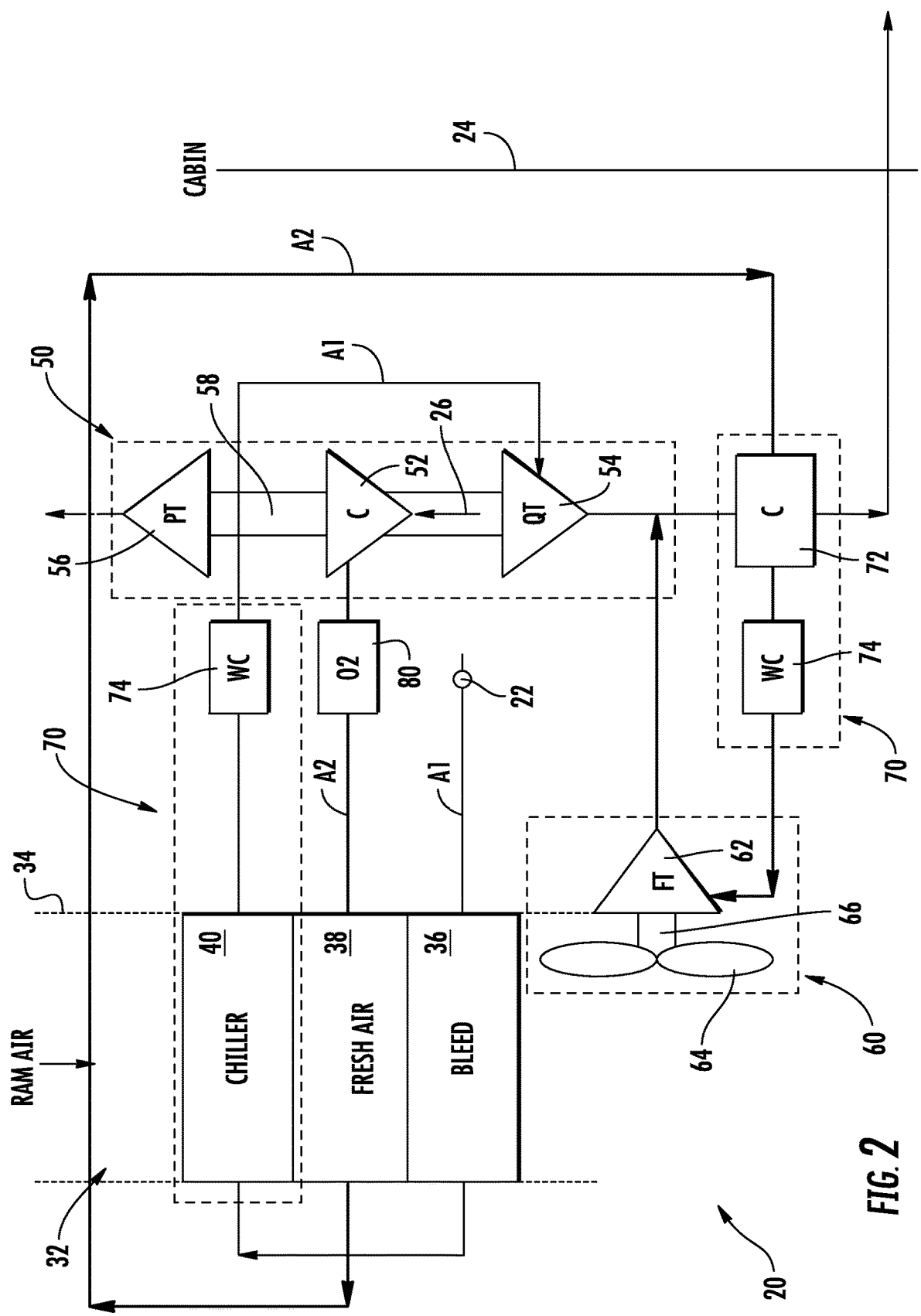
FIG. 2 is a simplified schematic of a system as shown in FIG. 1 operating in an "Overdrive" mode according to an embodiment.

With reference to FIG. 2, operation of the system in the overdrive mode is illustrated in more detail. In the overdrive mode, the system 20 is configured to provide a greater amount of airflow than is required such that the system 20 "overdrives" the fresh air requirement. In the overdrive mode, valve V1 for controlling a supply of the third medium A3 is closed. Accordingly, the third medium is not used to operate the system during the overdrive mode. Bleed air drawn from the inlet port 22 passes through the outflow heat exchanger 30 to the first heat exchanger 36. Within the first heat exchanger 36, the bleed air is cooled via a flow of ram air. In the overdrive mode, the first valve V1 is closed such that the first medium A1 passes from the first heat exchanger 36 to the third heat exchanger 40. Within the third heat exchanger 40, the moisture of the first medium A1 condenses. Moisture is removed from the wet first medium A1 within the water extractor 74 before being provided to an inlet nozzle of the turbine 54 of the compression device 50. Within the turbine 54, the first medium A1 is expanded and work is extracted, to power operation of the compressor 52.

Simultaneously, a supply of second medium A2 is compressed within the compressor 52 causing the temperature of the second medium A2 to increase. The second medium A2 output from the compressor 52 passes sequentially through an ozone converter 80 and the second heat exchanger 38 to cool the second medium A2 to about an ambient temperature. From the second heat exchanger 38, the compressed second medium A2 is provided to the condenser 72 and then to the water extractor 74 of the second dehumidification system 70 to condense and remove moisture therefrom. The cool second medium A2 having a medium pressure is then provided to the turbine 62 of the expansion device 60 where it is expanded and work is extracted, thereby driving operation of the fan 64 which moves ram air through the ram air circuit 32. The second medium A2 output from the turbine 62 of the expansion device 60 and the first medium A1 output from the turbine 54 of the compressing device 50 are then combined prior to being provided to a condenser 72. The mixture of the first and second medium AM cools the second medium A2 output from the second heat exchanger 38 within the condenser 72. The mixture of air AM is then sent to one of more loads, including the volume 24.

Figure 3:
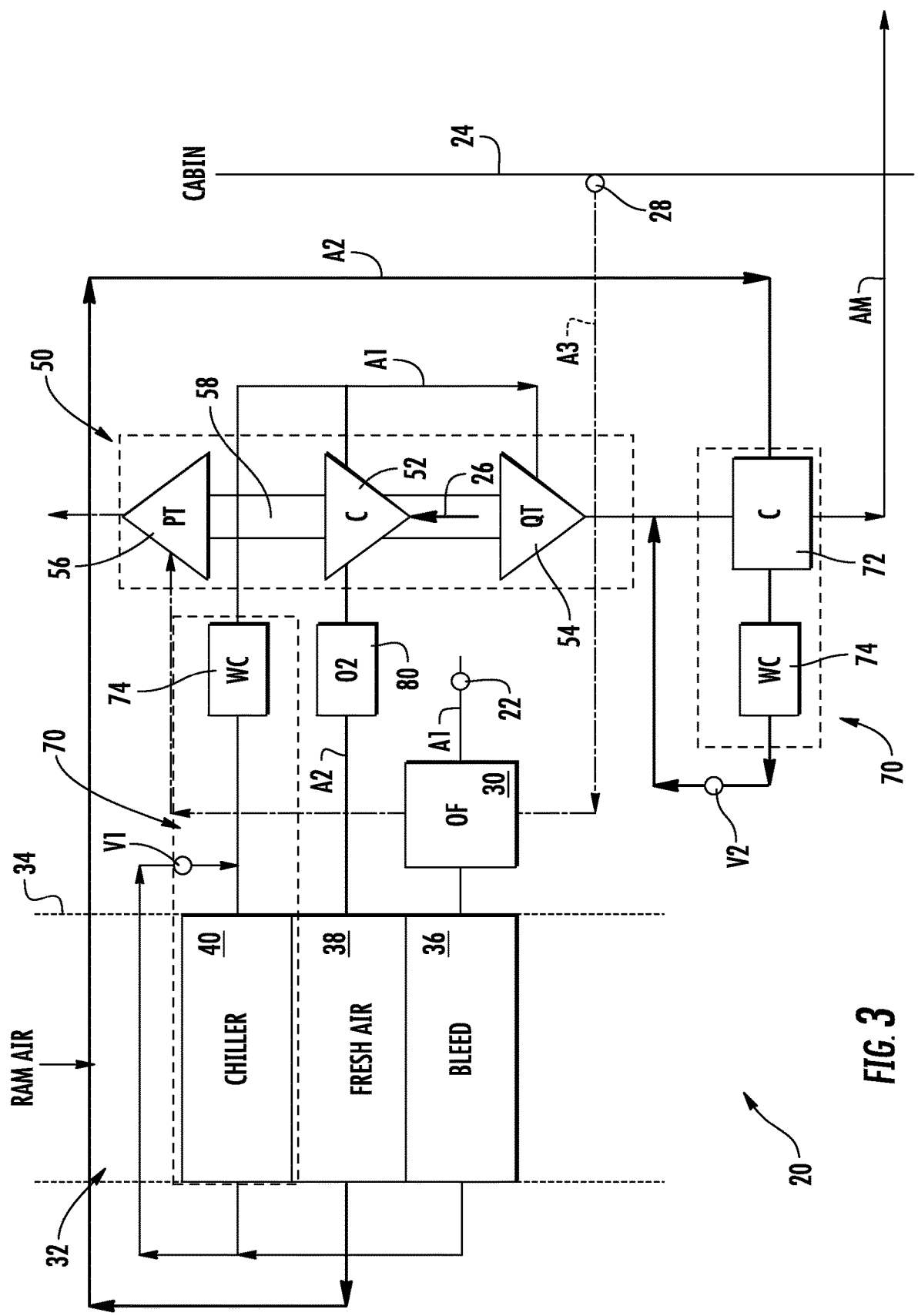
FIG. 3 is a simplified schematic of a system as shown in FIG. 1 operating in a "Bleed and Fresh Air Mixing" mode according to an embodiment.

With reference now to FIG. 3, operation of the system 20 in the "Bleed Air and Fresh Air Mixing Mode" is illustrated in more detail. The "Bleed Air and Fresh Air Mixing Mode" is typically selected when the aircraft is in one of high altitude climb, climb, and descent flight conditions. Bleed air drawn from the inlet port 22 is cooled within the outflow heat exchanger 30 and is then further cooled within the first heat exchanger 36. In the "Bleed Air and Fresh Air Mixing" mode, the first valve V1 is may be selectively or partially opened such that the a portion of first medium A1 passes through the third heat exchanger 40 and a portion of the first medium bypasses the third heat exchanger 40. Both portions of the first medium are then mixed adjacent the outlet of the third heat exchanger 40. The first valve V1 may be operable such that the mixture of the first medium that passes through the heat exchanger 40 and the first medium that bypassed the third heat exchanger 40 is a desired temperature. Moisture condensed within the third heat exchanger 40 is then removed from the wet first medium A1 within the water extractor 74 before being provided to an inlet nozzle of the turbine 54 of the compression device 50. Within the turbine 54, the first medium A1 is expanded and work is extracted, to power operation of the compressor 52.

A third medium, such as supplied from the cabin 24, passes through the outflow heat exchanger 30, where the third medium absorbs heat from the first medium A1, before being supplied to the power turbine 56 of the compression device 50. Within the turbine 56, the third medium A3 is expanded and work is extracted, to power operation of the compressor 52. The third medium expelled from the power turbine 56 may be exhausted overboard or into the ram air circuit 32. The compressor 52 receives power from both the turbine 54 and the power turbine 56. As a result, the amount of first medium A1 required for operation of the system 20 may be reduced by more than 50%.

A supply of second medium A2 is provided to and compressed within the compressor 52 causing the temperature of the second medium A2 to increase. The second medium A2 output from the compressor 52 passes sequentially through an ozone converter 80 and the second heat exchanger 38 to cool the second medium to about an ambient temperature. From the second heat exchanger 38, the compressed second medium is provided to the condenser 72 and then to the water extractor of the second dehumidification system 70 to condense and remove moisture therefrom. In the "Bleed Air and Fresh Air Mixing" mode, the second valve V2 is open such that the cool second medium A2 having a medium pressure bypasses the expansion device 50 entirely.

The second medium A2 output from the water extractor 74 and the first medium A1 output from the turbine 54 of the compressing device 50 are then combined prior to being provided to a condenser 72. The mixture of the first and second medium AM cools the second medium A2 output from the second heat exchanger 38 within the condenser 38. The mixture of air AM is then sent to one of more loads, including the cabin 24.

Figure 4:
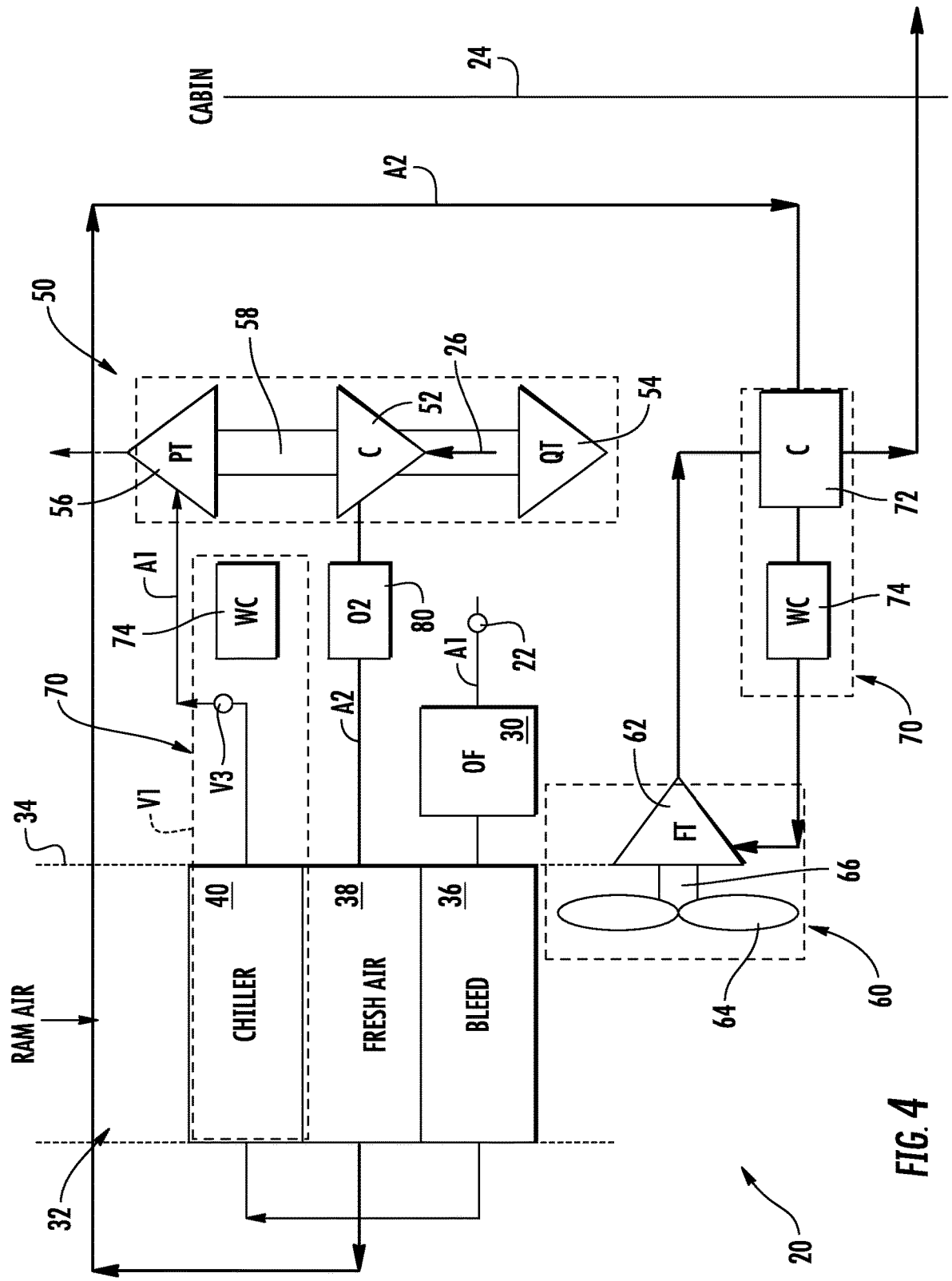
FIG. 4 is a simplified schematic of a system as shown in FIG. 1 operating in a "100% Fresh Air" mode according to an embodiment.

With reference now to FIG. 4, in the "100% Fresh Air" mode, bleed air drawn from the inlet port 22 is initially cooled within the first heat exchanger 36 and is further cooled within the third heat exchanger 40. A third valve V3, is open such that the medium output from the third heat exchanger 40 is configured to bypass the water extractor and is provided to the power turbine 56. Within the power turbine 56, the first medium A1 is expanded and work is extracted, to power operation of the compressor 52. The first medium A1 expelled from the power turbine 56 is exhausted overboard or may be dumped within the ram air circuit 32.

A supply of second medium A2 is compressed within the compressor 52 causing the temperature of the second medium A2 to increase. The second medium A2 output from the compressor 52 passes sequentially through an outflow heat exchanger 80 and the second heat exchanger 38 to cool the second medium to about an ambient temperature. From the second heat exchanger 38, the compressed second medium A2 is provided to the condenser 72 and then to the water extractor 74 of the second dehumidification system 70 to condense and remove moisture therefrom. The cool second medium A2 having a medium pressure is then provided to the turbine 62 of the expansion device 60 where it is expanded and work is extracted, thereby driving operation of the fan 64 which moves ram air and the first medium A1 exhausted from the power turbine 56 through the ram air circuit 32. The second medium A2 output from the turbine 62 of the expansion device 60 is then returned to the condenser 72. The second medium A2 output from the turbine 62 cools the second medium A2 output from the second heat exchanger 38 within the condenser 38. The second medium A2 is then distributed to one or more downstream loads, including but not limited to the cabin 24.

As illustrated, the system 20 is typically operated in the a "100% Fresh Air" mode such that only the second medium A2 is provided to the cabin 24 or other loads when the aircraft is flying at low altitude or in on the ground. However, the "100% Fresh Air" mode may be adapted for use in any flight condition. For example, if the aircraft is at high altitude flight, valve V2 may be open such that the second medium A2 bypasses the turbine 62 of the expansion device 60.

Figure 5:
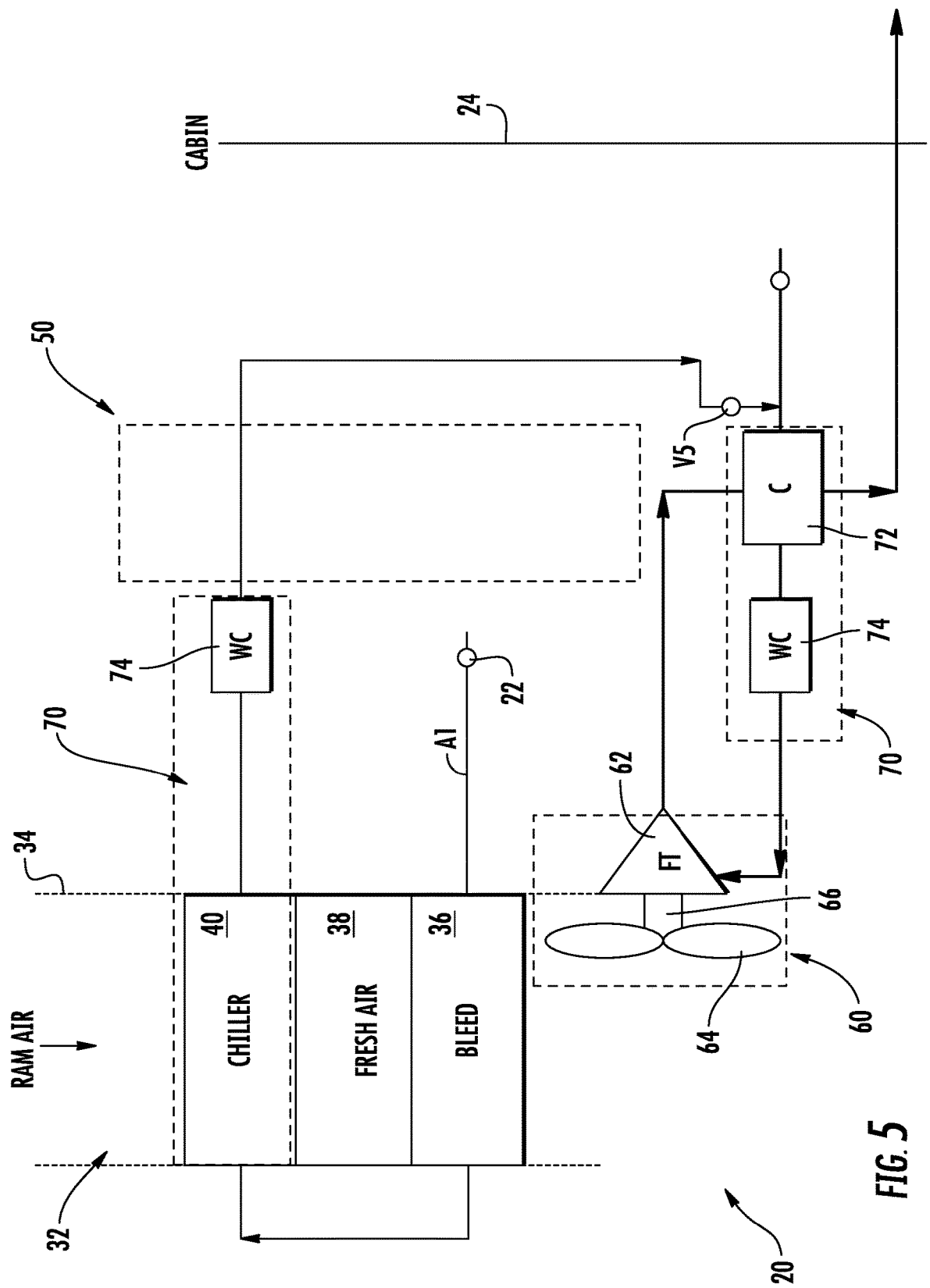
FIG. 5 is a simplified schematic of a system as shown in FIG. 1 operating in a "Pack and a Quarter" or "failed" mode according to an embodiment.

The system 20 is operable in the "Pack and a Quarter" mode upon the occurrence of a failure of the compressing device 50. With reference now to FIG. 5, in such embodiments, only the first medium A1 is provided to the system 20. As in the previous modes, bleed air drawn from the inlet port 22 is initially cooled within the first heat exchanger 36 and is further cooled within the third heat exchanger 40. Moisture condensed within the third heat exchanger 40 is then removed from the wet first medium A1 within the water extractor 74.

By closing a fourth valve V4 upstream from the turbine 54 of the expansion device 50 and opening a fifth valve V5, the first medium A1 is directed from the water extractor 74 of the first dehumidification system 70 to the condenser 72 and water extractor 74 of the second dehumidification system 70. The cool first medium A1 is then provided to the turbine 62 of the expansion device 60 where it is expanded and work is extracted, thereby driving operation of the fan 64 which moves ram air through the ram air circuit 32. The first medium A1 output from the turbine 62 of the expansion device 60 is then returned to the condenser 72. The first medium A1 output from the turbine 62 cools the first medium A1 output from the water extractor of the first dehumidification system 70 within the condenser 38. The first medium A1 is then distributed to one or more downstream loads, including but not limited to the cabin 24. In an embodiment, an additional supply of first medium A1 may be supplied from an inlet 23 to be mixed with the first medium A1 having passed through the ram air circuit 32 upstream from the condenser 38.

It should be understood that the "Pack and a Quarter" mode may be used during any flight condition. For example, if the aircraft is at high altitude flight, valve V2 may be open such that the first medium A1 bypasses the turbine 62 of the expansion device 60. In addition, inclusion of the fifth valve V5, is configured to direct the flow of first medium A1 to bypass the ozone converter (not shown). This valve may be used when the aircraft is on the ground to extend the life of the ozone converter.

Aspects of the embodiments are described herein with reference to flowchart illustrations, schematics, and/or block diagrams of methods, apparatus, and/or systems according to embodiments. Further, the descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

While the preferred embodiment has been described, it will be understood that those skilled in the art, both now and in the future, may make various improvements and enhancements which fall within the scope of the claims which follow. These claims should be construed to maintain the proper protection.

What is claimed is:

1. An environmental control system of an aircraft comprising:
    a ram air circuit including a ram air shell having a plurality of heat exchangers positioned therein, the plurality of heat exchangers including a first heat exchanger, a second heat exchanger, and a third heat exchanger, wherein the ram air circuit is configured and arranged so that a first medium received at the first heat exchanger passes through the first heat exchanger and then through the third heat exchanger and so that a second medium, distinct from the first medium, is provided to the second heat exchanger, the first medium and the second medium being arranged in a heat exchange relationship with a flow of ram air within the ram air circuit, wherein the second heat exchanger is positioned between the first heat exchanger and the third heat exchanger, wherein in at least one mode of operation of the environmental control system, the first medium output from the first heat exchanger is provided directly to an inlet of the third heat exchanger; and
    an air cycle machine arranged in fluid communication with the ram air circuit, the air cycle machine including a compressor and a turbine, wherein the turbine is fluidly coupled to the first heat exchanger and the third heat exchanger such that the first medium is provided to the turbine and the compressor is arranged in fluid communication with the second heat exchanger such that the second medium is provided to the compressor.

2. The environmental control system of claim 1, wherein the first heat exchanger, the second heat exchanger and the third heat exchanger are coupled together.

3. The environmental control system of claim 1, wherein the first heat exchanger, the second heat exchanger and the third heat exchanger are distinct portions within a single unitary body.

4. The environmental control system of claim 1, wherein the first heat exchanger, the second heat exchanger and the third heat exchanger are arranged sequentially relative to a flow of ram air.

5. The environmental control system of claim 4, wherein the ram air is configured to interact with the third heat exchanger prior to the first heat exchanger and the second heat exchanger.

6. The environmental control system of claim 1, wherein the first medium is bleed air.

7. The environmental control system of claim 1, wherein the second medium is fresh air.

8. An environmental control system of an aircraft comprising:
    a ram air circuit including a ram air shell having a plurality of heat exchangers including at least a first heat exchanger, a second heat exchanger, and a third heat exchanger positioned therein, the first heat exchanger, the second heat exchanger and the third heat exchanger being arranged sequentially relative to a flow of ram air, each of the plurality of heat exchangers having an inlet and an outlet, wherein an outlet of the first heat exchanger is fluidly connected to the inlet of the third heat exchanger such that the first medium flows sequentially through the first heat exchanger and the third heat exchanger, wherein the inlet end of each of the plurality of heat exchangers is aligned such that the first medium flows through the first heat exchanger and the third heat exchanger and the second medium flows through the second heat exchanger in the same direction; and
    an air cycle machine arranged in fluid communication with the ram air circuit, the air cycle machine including a compressor and a turbine operably coupled by a shaft, wherein the turbine is fluidly coupled to the first heat exchanger such that the first medium output from the first heat exchanger is provided to the turbine and the compressor is arranged in fluid communication with the second heat exchanger such that the second medium output from the compressor is provided to the second heat exchanger.

9. The environmental control system of claim 8, wherein the first heat exchanger and the second heat exchanger are coupled together.

10. The environmental control system of claim 8, wherein the first heat exchanger and the second heat exchanger are distinct portions within a single unitary body.

11. The environmental control system of claim 8, wherein the flow of ram air is configured to interact with the third heat exchanger prior to the first heat exchanger and the second heat exchanger.

12. The environmental control system of claim 8, wherein the first medium is bleed air.

13. The environmental control system of claim 8, wherein the second medium is fresh air.

14. The environmental control system of claim 8, wherein each of the first medium and the second medium provided to each inlet end of the plurality of heat exchangers is warmer than a flow of ram air at each of the plurality of heat exchanger.

15. An environmental control system of an aircraft comprising:
- a ram air circuit including a ram air shell having a plurality of heat exchangers including at least a first heat exchanger, a second heat exchanger, and a third heat exchanger positioned therein, the second heat exchanger being positioned between the first heat exchanger and the third heat exchanger relative to a flow of ram air, each of the plurality of heat exchangers having an inlet and an outlet, wherein an outlet of the first heat exchanger is fluidly connected to the inlet of the third heat exchanger such that the first medium flows sequentially through the first heat exchanger and the third heat exchanger, wherein the inlet end of each of the plurality of heat exchangers is aligned such that the first medium flows through the first heat exchanger and the third heat exchanger and the second medium flows through the second heat exchanger in the same direction; and
- an air cycle machine arranged in fluid communication with the ram air circuit, the air cycle machine including a compressor and a turbine operably coupled by a shaft, wherein the turbine is fluidly coupled to the first heat exchanger such that the first medium output from the first heat exchanger is provided to the turbine and the compressor is arranged in fluid communication with the second heat exchanger such that the second medium output from the compressor is provided to the second heat exchanger.

\* \* \* \* \*